United States Patent Office
2,768,145
Patented Oct. 23, 1956

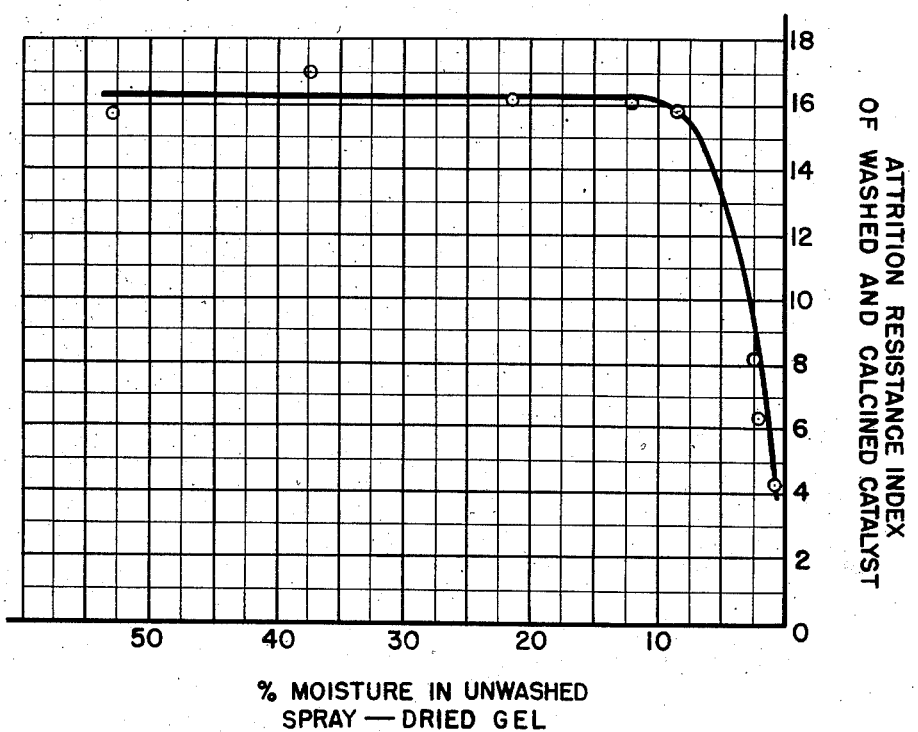
EFFECT OF MOISTURE CONTENT FROM SPRAY DRIER ON ATTRITION RESISTANCE

2,768,145

METHOD OF MANUFACTURING SILICA ALUMINA CATALYST

Thomas O. Tongue, Curtis Bay, and Leon L. Baral, Baltimore, Md., assignors to W. R. Grace & Co., New York, N. Y., a corporation of Connecticut Application January 12, 1951, Serial No. 205,784

4 Claims. (Cl. 252—448)

This invention relates to catalysts and more particularly to a method of preparing microspheres of a silica-alumina catalyst. This application is a continuation in part of United States Application Serial No. 70,362, filed January 11, 1949, for a Method of Manufacturing Silica-Alumina Catalyst, now abandoned.

The development of fluid catalytic processes, especially for the cracking of petroleum oils, has caused a demand for catalysts having a fine particle size, preferably in the order of twenty to eighty microns in diameter. Particles having a diameter smaller than twenty microns are objectionable in that they will be lost in the regeneration of the catalyst following a pass through the reaction vessel.

Catalysts for use in fluid catalytic processes were originally prepared by grinding a catalytic material to the desired particle size. Individual particles of granular or powdered catalysts prepared in this manner are irregular in shape and possess many sharp points which seriously increase the rate of erosion of the equipment through which the catalysts pass. Moreover, the many sharp corners of the irregular particles are easily broken off by attrition to form a large quantity of fines which will be lost during the catalytic operations, and particularly during regeneration of the catalyst.

Many of the disadvantages of the granular or powdered catalysts can be avoided by preparing a catalyst in the form of microspheres. Microspheres are ordinarily prepared by spray-drying sols, washed hydrogels, or unwashed hydrogels. Heretofore, the moisture content to which the unwashed hydrogels or sols have been spray-dried has been as high as possible and still form substantially rigid microspheres of irreversible gel. In general, it has been the practice to spray-dry to form microspheres having as high a moisture content as possible and still produce rigid spheres of irreversible gel that will retain their individual form. Usually it is only necessary to dry the spray-dried material to 30–50% total volatile in order to obtain an irreversible gel. By spray-drying only to the maximum moisture content consistent with the formation of an irreversible gel, the spray-drying equipment was operated at its maximum capacity. Moreover, moisture was not unnecessarily removed from the gel and then returned to the gel in the subsequent washing procedure. In this invention, we have discovered that a catalyst with improved resistance to attrition can be prepared by spray-drying an unwashed gel to a maximum moisture content far below that required to form an irreversible gel.

In order to provide a measure for comparison of the attrition resistance of the various catalysts, a standard test procedure known as the Roller Test has been developed. In this test, a sample of catalyst is attrited by a blast of air for a specified length of time under narrowly defined conditions. A size analysis of the catalyst is made before and after the attrition to determine the increase in the fraction of catalyst having a particle size between 0 and 20 microns. The attrition index is the percentage increase in 0 to 20 micron material and is determined according to the following formula:

$$\text{Attrition index} = 100 \times \frac{\text{percent 0 to 20 material after attrition} - \text{percent 0 to 20 material before attrition}}{\text{percent plus 20 micron material originally present}}$$

It is an object of this invention to provide an improved attrition resistant catalyst.

Another object of this invention is to provide microspheres of silica-alumina catalysts characterized by a high resistance to attrition suitable for use in fluid catalytic processes.

It is also an object of this invention to provide a method for manufacturing microspheres of silica-alumina catalysts in which a slurry of silica-alumina hydrogel is spray-dried to form microspheres prior to the washing of the gel.

A further object is to provide a method for the manufacture of a silica-alumina catalyst in which a slurry of an unwashed hydrogel is spray-dried to a moisture content below about 8% and subsequently washed and calcined to form an active, attrition-resistant catalyst.

Still another object of this invention is to provide a novel method for the formation of a silica-alumina catalyst in the form of microspheres in which a filterable slurry of a silica-alumina hydrogel is formed, spray-dried in an unwashed state and then washed and calcined.

With these and other objects in view, as will become apparent in the following detailed description, this invention resides in forming a filterable slurry of silica-alumina hydrogel or gelatinous precipitate and separating the hydrogel from the excess mother liquor whereby about one-half of the soluble salts are removed. The silica-alumina material is then slurried in a minimum amount of water and spray-dried to a moisture content below about 8% to form microspheres which then are washed, dried, and activated to form a catalyst characterized by an improved resistance to attrition.

In the drawings:

The single figure of the drawings is a graph in which the effect of the moisture content of the spray-dried gel on the attrition-resistant properties of the catalyst is illustrated.

A preferred method of preparing a silica-alumina hydrogel for treatment according to this invention is to mix a dilute solution of sodium silicate and sulfuric acid with vigorous agitation in proportions to form a slightly alkaline reaction product. As an example of preferred conditions, a solution of 5.9° Bé. sodium silicate may be mixed to form a slurry containing about 3.6% silica and a pH of 9.9. The gelation time of the reaction product of the example is about five minutes, but may range from two to ten minutes and is determined by the pH of the reaction mixture. For example, if the pH of the reaction mixture is reduced to about 9.3, the time of gelation will be reduced to about 4.2 minutes. The precipitatation and gelation of particles forming the slurry is completed by the addition of additional sulfuric acid in quantities sufficient to control the pH of the slurry between about 2½ and 6. The agitation of the reaction product forms a slurry of a pumpable, filterable mass readily handled in subsequent operations.

Impregnation of the particles of silica hydrogel with aluminum in a soluble form is accomplished by adding a solution of aluminum sulfate to the acidified slurry. The addition of aluminum sulfate lowers the pH of the slurry further, and the pH at this stage will depend on the amount of aluminum sulfate added. Hence, the concentration of alumina desired in the final product, rather than control of the reaction, will determine the pH of the slurry after the addition of aluminum sulfate.

Following the impregnation of the hydrogel with aluminum sulfate an aqueous solution of ammonia is added to the slurry in quantities sufficient to raise the pH to a range of 6.0 to 7.5. In this manner, the alumium present in the hydrogel particles is precipitated as a substantially insoluble hydrated alumina.

While the method described above for the preparation of the filterable slurry of hydrated silica-alumina is preferred, it is to be understood that this invention is not limited to the details of the procedure described. For example, a slurry of hydrated silica-alumina may be prepared according to the procedural steps described in the parent application Serial No. 70,362, filed January 11, 1949, entitled Method and Manufacturing of Silica-Alumina Gel, now abandoned.

In the treatment of the slurry of silica-alumina hydrogel according to this invention, the slurry of hydrogel is dewatered by draining the mother liquor from the hydrogel particles following the precipitation of the alumina in the hydrogel. Ordinarily the dewatering will be obtained by filtering the hydrogel, and in most instances, this may be accomplished on conventional continuous rotary filters. The dewatering of the hydrogel by removal of the mother liquor will result in the removal of about one-half of the soluble salts formed in the preparation of the slurry of silica-alumina hydrogel but will leave the hydrogel in an unwashed condition.

The filter cake from the draining operation is reslurried by the addition of a minimum amount of water. The amount of water added is determined only by the amount necessary to form a pumpable slurry suitable for spray-drying. Ordinarily the amount of water added will be such that the resultant slurry contains 10% solids or higher. The reslurried material is pumped to the atomizer of a conventional spray-drier in which the atomized material is passed in contact with hot gases which reduce the water content of the hydrogel to below about 8% and form microspheres of silica-alumina gel. In the preferred form of the invention, the hydrogel is dried to a moisture content of about 3 to 4%.

As a specific example of the formation of microspheres by spray-drying according to this invention, 388 lbs. of silica-alumina hydrogel from which the mother liquor had been drained and having an alumina content of 12.8% and a TV of approximately 90% was slurried by agitating with 65.9 lbs. of water. This slurry was pumped at a pressure of approximately 2,000 lbs. per square inch to the nozzle of a conventional spray-drier. Approximately 17,500 cubic feet per minute of air were introduced into the spray-drier at a temperature of 713° F. and was discharged from the drier at a temperature of 304° F. The slurry was sprayed into the drier at a rate producing 12½ pounds per minute of microspheres having a moisture content of 2.31%.

The example given above is only for purposes of illustration of operating conditions suitable for the practice of this invention. The temperature of the gases introduced into the drier may vary from 212° F. to 1500° F. and preferably will be in the neighborhood of 1200° F. The pressure at the discharge of the pump delivering the slurry to the nozzle of the spray-drier may vary from 300 to 5,000 lbs. per square inch and will depend in part on the moisture content of the slurry and the degree of atomization desired in the spray-drier. Obviously, the temperature and rate of flow of the gases through the spray-drier and the rate of feed of the slurry will have to be correlated to control the moisture content to which the microspheres are dried.

The microspheres of unwashed silica-alumina gel are washed by conventional methods for substantially complete removal of the soluble salts therefrom. Ordinarily the washing is accomplished by re-slurrying the dried material with water or a dilute solution of ammonium sulfate and again filtering the slurry. The re-slurrying and filtering is repeated until the desired degree of removal of the soluble salts is obtained. It will be appreciated that other conventional washing procedures, such as countercurrent continuous washing systems, may be employed for the removal of the soluble salts from the spray-dried material.

The washed microspheres of silica-alumina gel are dewatered and then calcined to the desired moisture content to form a product suitable for use as a catalyst. A typical catalyst prepared according to this invention may have a concentration of 13% alumina, on a dry basis, and 12% moisture.

It has been found that by spray-drying the unwashed silica-alumina hydrogel to a moisture content below about 8%, a surprising increase in the attrition resistance of the washed and calcined final product is obtained. In Figure 1 of the drawings and Table I below, the effect of the moisture content to which the unwashed silica-alumina hydrogel is spray-dried on the attrition resistance of the finally washed and calcined product is illustrated. The data set forth in Table I and Figure 1 were obtained by spray-drying a slurry of unwashed silica-alumina hydrogel prepared according to the method described above to different moisture contents. Each of the spray-dried materials was then washed to remove the soluble salts and calcined to give a dried catalyst product. The different samples of catalyst were tested according to the standard roller test and the attrition index calculated.

TABLE I

*Effect of moisture content of spray-dried unwashed gel on attrition resistance of catalyst*

| Moisture Content After Spray Drying | Percent 0-20 before attrition | Percent 0-20 after attrition | Attrition Resistance Index, Percent |
| --- | --- | --- | --- |
| 0.49 | 2.9 | 7.0 | 4.2 |
| 1.97 | 4.1 | 10.1 | 6.3 |
| 2.31 | 9.3 | 16.7 | 8.2 |
| 8.4 | 4.3 | 19.4 | 15.8 |
| 12.05 | 5.1 | 17.5 | 16.1 |
| 21.37 | 5.8 | 21.5 | 16.7 |
| 37.33 | 8.1 | 23.7 | 17.0 |
| 52.8 | 1.6 | 17.0 | 15.7 |

It will be noted that the attrition resistance index of catalysts formed from unwashed hydrogels which have been spray-dried to a moisture content above about 8% is substantially constant in the vicinity of about 16.5%. If the unwashed slurry is spray-dried to a moisture content below about 8%, the attrition resistance increases sharply and the attrition resistance index drops rapidly. At a moisture content of about 3 to 4%, which is the preferred range of operation, the attrition resistance index is about 10.5; however, spray-drying to a lower water content will result in still further improvement in attrition resistance.

We claim:

1. A method of manufacturing a silica-alumina catalyst in the form of microspheres comprising forming a slurry of finely divided unwashed particles of hydrated silica-alumina, spray-drying the slurry to a moisture content of below about 4%, washing the spray-dried product to remove soluble salts therefrom, and calcining the washed material.

2. A method of manufacturing a silica-alumina catalyst in the form of microspheres comprising forming a slurry of finely divided unwashed particles of silica-alumina hydrogel, spray-drying the slurry to a moisture content of about 3 to 4%, washing the spray-dried product to remove soluble salts therefrom, and calcining the washed material.

3. A method of preparing microspheroidal silica-alumina catalysts comprising forming an aqueous acid-reacting slurry of silica hydrogel, adding aluminum sulfate to said slurry to impregnate the hydrogel particles therewith, adding aqueous ammonia to said slurry to precipitate hydrated alumina, dewatering the resulting silica-alumina composite, re-slurrying said composite, spray drying the re-slurried material without further washing to a moisture content of about 3 to 4%, washing the spray dried material to remove soluble salts therefrom, and calcining the salt-free material to form a catalyst of silica-alumina microspheres having an enhanced attrition resistance.

4. In the process for manufacturing microspheroidal silica-alumina catalysts wherein a silica hydrogel is contacted with an aqueous solution of a soluble aluminum salt, ammonia is added to precipitate alumina onto the hydrated silica particles, and the resulting composite is spray dried to produce microspheroidal particles, the method of enhancing the attrition resistance of the finished catalyst comprising spray drying a slurry of the unwashed silica-alumina composite to a moisture content of about 3 to 4% and subsequently washing the spray dried material to remove the water soluble salts therefrom.

References Cited in the file of this patent

UNITED STATES PATENTS

| | | |
|---|---|---|
| 1,772,055 | Miller et al. | Aug. 5, 1930 |
| 2,270,090 | Thomas | Jan. 13, 1942 |
| 2,384,946 | Marisic | Sept. 18, 1945 |
| 2,429,319 | Kearby | Oct. 21, 1947 |
| 2,435,158 | Read | Jan. 27, 1948 |
| 2,435,379 | Archibald | Feb. 3, 1948 |
| 2,463,467 | Marisic | Mar. 1, 1949 |
| 2,555,282 | Ashley | May 29, 1951 |

FOREIGN PATENTS

| | | |
|---|---|---|
| 610,080 | Great Britain | Oct. 10, 1948 |
| 644,322 | Great Britain | Oct. 10, 1950 |